(12) United States Patent
Webster et al.

(10) Patent No.: US 10,760,431 B2
(45) Date of Patent: Sep. 1, 2020

(54) COMPONENT FOR A TURBINE ENGINE WITH A COOLING HOLE

(71) Applicant: General Electric Company, Schenectady, NY (US)

(72) Inventors: Zachary Daniel Webster, Mason, OH (US); Aaron Ezekiel Smith, Hermosa Beach, CA (US); Kirk D. Gallier, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 194 days.

(21) Appl. No.: 15/697,886

(22) Filed: Sep. 7, 2017

(65) Prior Publication Data
US 2019/0071976 A1    Mar. 7, 2019

(51) Int. Cl.
| | |
|---|---|
| *F01D 5/18* | (2006.01) |
| *F01D 9/04* | (2006.01) |
| *F01D 25/12* | (2006.01) |
| *F01D 9/06* | (2006.01) |
| *F01D 9/02* | (2006.01) |
| *F02K 1/82* | (2006.01) |
| *F23R 3/00* | (2006.01) |

(52) U.S. Cl.
CPC ............. *F01D 5/186* (2013.01); *F01D 9/023* (2013.01); *F01D 9/041* (2013.01); *F01D 9/065* (2013.01); *F01D 25/12* (2013.01); *F02K 1/822* (2013.01); *F23R 3/002* (2013.01); *F05D 2220/323* (2013.01); *F05D 2230/50* (2013.01); *F05D 2240/11* (2013.01); *F05D 2240/124* (2013.01); *F05D 2240/306* (2013.01); *F05D 2240/81* (2013.01); *F05D 2250/73* (2013.01); *F05D 2260/202* (2013.01); *F23R 2900/03042* (2013.01)

(58) Field of Classification Search
CPC ............... F01D 5/186; F05D 2260/202; F23R 2900/03042
See application file for complete search history.

(56) References Cited

U.S. PATENT DOCUMENTS

| | | | |
|---|---|---|---|
| 4,705,455 A * | 11/1987 | Sahm | F01D 5/186 415/115 |
| 5,864,949 A | 2/1999 | Kildea | |
| 6,176,676 B1 | 1/2001 | Ideda et al. | |
| 6,183,199 B1 * | 2/2001 | Beeck | F01D 5/186 416/97 R |
| 6,781,091 B2 | 8/2004 | Byrd et al. | |
| 6,897,401 B2 | 5/2005 | Kildea | |
| 7,992,272 B2 | 8/2011 | Janssen et al. | |
| 8,066,484 B1 * | 11/2011 | Liang | F01D 5/186 415/115 |
| 8,157,526 B2 * | 4/2012 | Beck | F01D 5/186 416/97 R |
| 8,292,584 B2 * | 10/2012 | Beck | F01D 5/186 416/97 R |

(Continued)

*Primary Examiner* — Kevin R Steckbauer
(74) *Attorney, Agent, or Firm* — McGarry Bair PC (57) ABSTRACT

An apparatus and method relating to a cooling hole of a component of a turbine engine. The cooling hole can extend from an inlet to an outlet to define a connecting passage. The cooling hole can contain a diffusing section. The diffusing section can be defined by an interior surface having variable geometries.

20 Claims, 7 Drawing Sheets

(56) References Cited

U.S. PATENT DOCUMENTS

| | | | | |
|---|---|---|---|---|
| 8,733,111 | B2* | 5/2014 | Gleiner | F23R 3/06 |
| | | | | 415/115 |
| 9,279,330 | B2* | 3/2016 | Xu | F01D 9/041 |
| 9,598,979 | B2* | 3/2017 | Reed | B26F 3/004 |
| 9,696,035 | B2* | 7/2017 | Starkweather | F23R 3/06 |
| 10,041,356 | B2* | 8/2018 | Lewis | F01D 9/041 |
| 10,309,239 | B2* | 6/2019 | Spangler | F01D 5/186 |
| 10,378,361 | B2* | 8/2019 | Lee | F01D 5/186 |
| 2009/0067998 | A1* | 3/2009 | Beck | F01D 5/186 |
| | | | | 415/175 |
| 2011/0300000 | A1* | 12/2011 | Beck | F23R 3/04 |
| | | | | 416/97 R |
| 2012/0205355 | A1* | 8/2012 | Munzer | B23K 26/389 |
| | | | | 219/121.71 |
| 2013/0205792 | A1* | 8/2013 | Gleiner | F01D 5/186 |
| | | | | 60/754 |
| 2013/0206739 | A1* | 8/2013 | Reed | B23K 26/082 |
| | | | | 219/121.71 |
| 2016/0010473 | A1* | 1/2016 | Spangler | F01D 11/20 |
| | | | | 415/177 |
| 2016/0153283 | A1* | 6/2016 | Xu | F01D 5/186 |
| | | | | 415/115 |
| 2018/0010484 | A1* | 1/2018 | Reed | B23K 26/082 |
| 2019/0071977 | A1* | 3/2019 | Webster | F01D 9/02 |
| 2019/0186272 | A1* | 6/2019 | Webster | F23R 3/002 |
| 2019/0186277 | A1* | 6/2019 | Spangler | F01D 9/065 |

* cited by examiner

COMPONENT FOR A TURBINE ENGINE WITH A COOLING HOLE

BACKGROUND OF THE INVENTION

Turbine engines, and particularly gas or combustion turbine engines, are rotary engines that extract energy from a flow of combusted gases passing through the engine onto a multitude of rotating turbine blades.

Engine efficiency increases with temperature of combustion gases. However, the combustion gases heat the various components along their flow path, which in turn requires cooling thereof to achieve a long engine lifetime. Typically, the hot gas path components are cooled by bleeding air from the compressor. This cooling process reduces engine efficiency, as the bled air is not used in the combustion process.

Turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary turbine engine components, thin metal walls of high strength superalloy metals are typically used for enhanced durability while minimizing the need for cooling thereof. Various cooling circuits and features are tailored for these individual components in their corresponding environments in the engine. In addition, all of these components typically include common rows of film cooling holes.

BRIEF DESCRIPTION OF THE INVENTION

In one aspect the disclosure relates to a component for a turbine engine, which generates a hot gas flow, and provides a cooling fluid flow, comprising a wall separating the hot gas flow from the cooling fluid flow and having a heated surface along which the hot gas flows and a cooled surface facing the cooling fluid flow; and at least one cooling hole comprising a connecting passage extending between an inlet at the cooled surface and an outlet defining a diffusing section and located at the heated surface having an increasing cross-sectional area in a direction toward the heated surface and defining spaced side walls forming an asymmetrical shape relative to a centerline of the diffusing section when viewed from a lateral plane through the centerline of the diffusing section passing through the side walls.

In another aspect the disclosure relates to a component for a turbine engine, which generates a hot gas flow, and provides a cooling fluid flow, comprising a wall separating the hot gas flow from the cooling fluid flow and having a heated surface along which the hot gas flows and a cooled surface facing the cooling fluid flow; and at least one cooling hole comprising a connecting passage extending between an inlet at the cooled surface and an outlet defining a diffusing section and located at the heated surface having an increasing cross-sectional area in a direction toward the heated surface and defining spaced side walls forming an asymmetrical shape relative to a centerline of the diffusing section when viewed from a lateral plane through the centerline of the diffusing section passing through the side walls.

In yet another aspect, the disclosure relates to a method of forming a cooling hole for an engine component, having a wall separating a hot gas flow from a cooling fluid flow and having a heated surface along which the hot gas flows and a cooled surface facing the cooling fluid flow, the method comprising forming a diffusing section with an asymmetrical cross-sectional shape relative to a centerline of the diffusing section when viewed from a lateral plane of the diffusing section passing through the side walls.

DESCRIPTION OF EMBODIMENTS OF THE INVENTION

Aspects of the disclosure described herein are directed to the formation of a hole such as a cooling hole in an engine component such as an airfoil. For purposes of illustration, the aspects of the disclosure discussed herein will be described with respect to the turbine for an aircraft turbine engine. It will be understood, however, that the disclosure as discussed herein is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline. Additionally, "downstream" and "upstream" can be used in a more local context, where "upstream" refers to a positional that is closer to an inlet of a particular flow passage or flow stream not necessarily in aligned with the engine centerline. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. Furthermore it should be understood that the term cross section or cross-sectional as used herein is referring to a section taken orthogonal to the centerline and to the general coolant flow direction in the hole. The exemplary drawings are for purposes of illustration only and the dimensions, positions, order and relative sizes reflected in the drawings attached hereto can vary.

Figure 1:
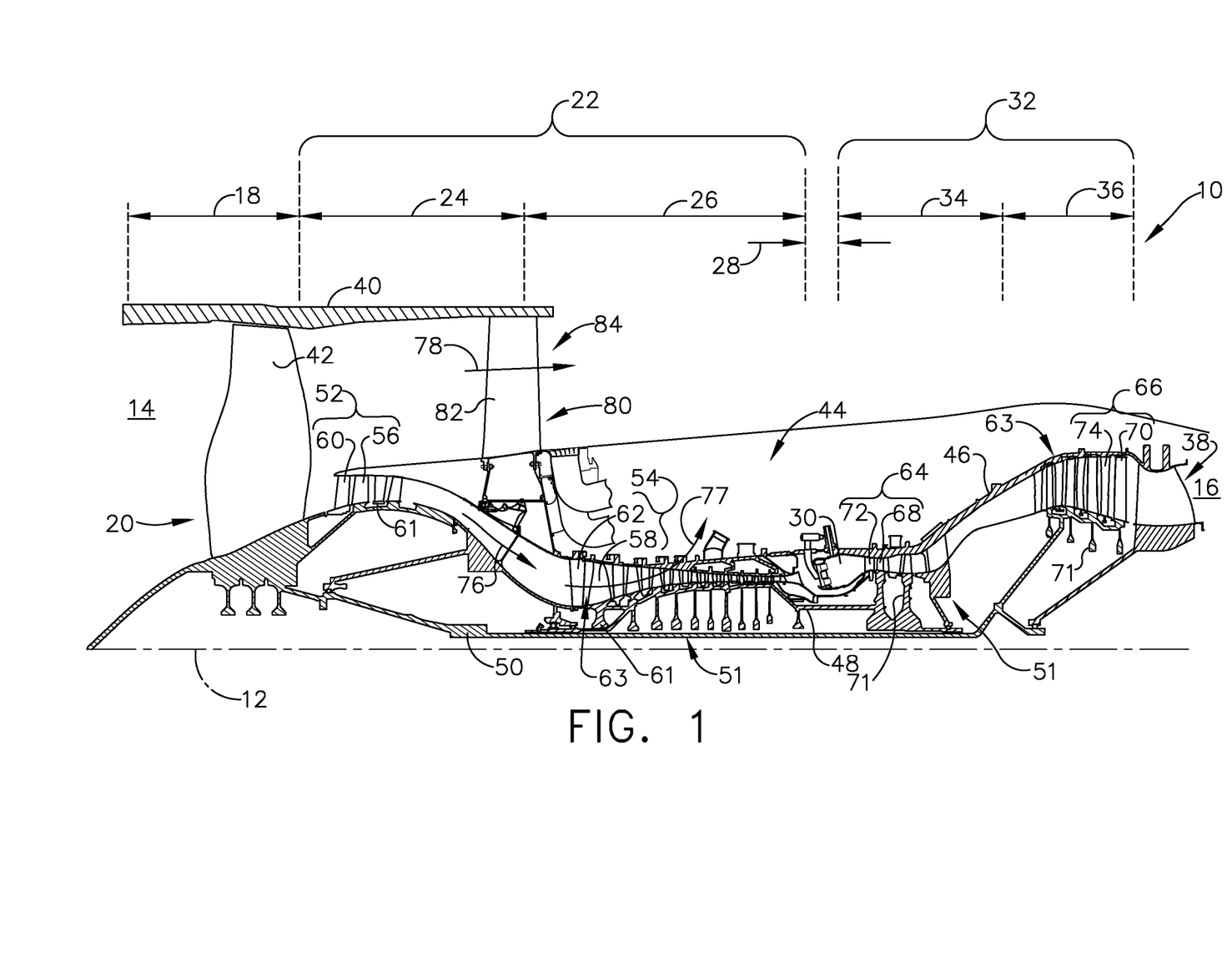
FIG. 1 is a schematic cross-sectional diagram of a turbine engine for an aircraft.

Referring to FIG. 1, an engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor mount to a disk 61, which mounts to the corresponding one of the HP and LP spools 48, 50, with each stage having its own disk 61. The vanes 60, 62 for a stage of the compressor mount to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can mount to a disk 71, which is mounts to the corresponding one of the HP and LP spools 48, 50, with each stage having a dedicated disk 71. The vanes 72, 74 for a stage of the compressor can mount to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 splits such that a portion of the airflow is channeled into the LP compressor 24, which then supplies pressurized air 76 to the HP compressor 26, which further pressurizes the air. The pressurized air 76 from the HP compressor 26 mixes with fuel in the combustor 30 where the fuel combusts, thereby generating combustion gases. The HP turbine 34 extracts some work from these gases, which drives the HP compressor 26. The HP turbine 34 discharges the combustion gases into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
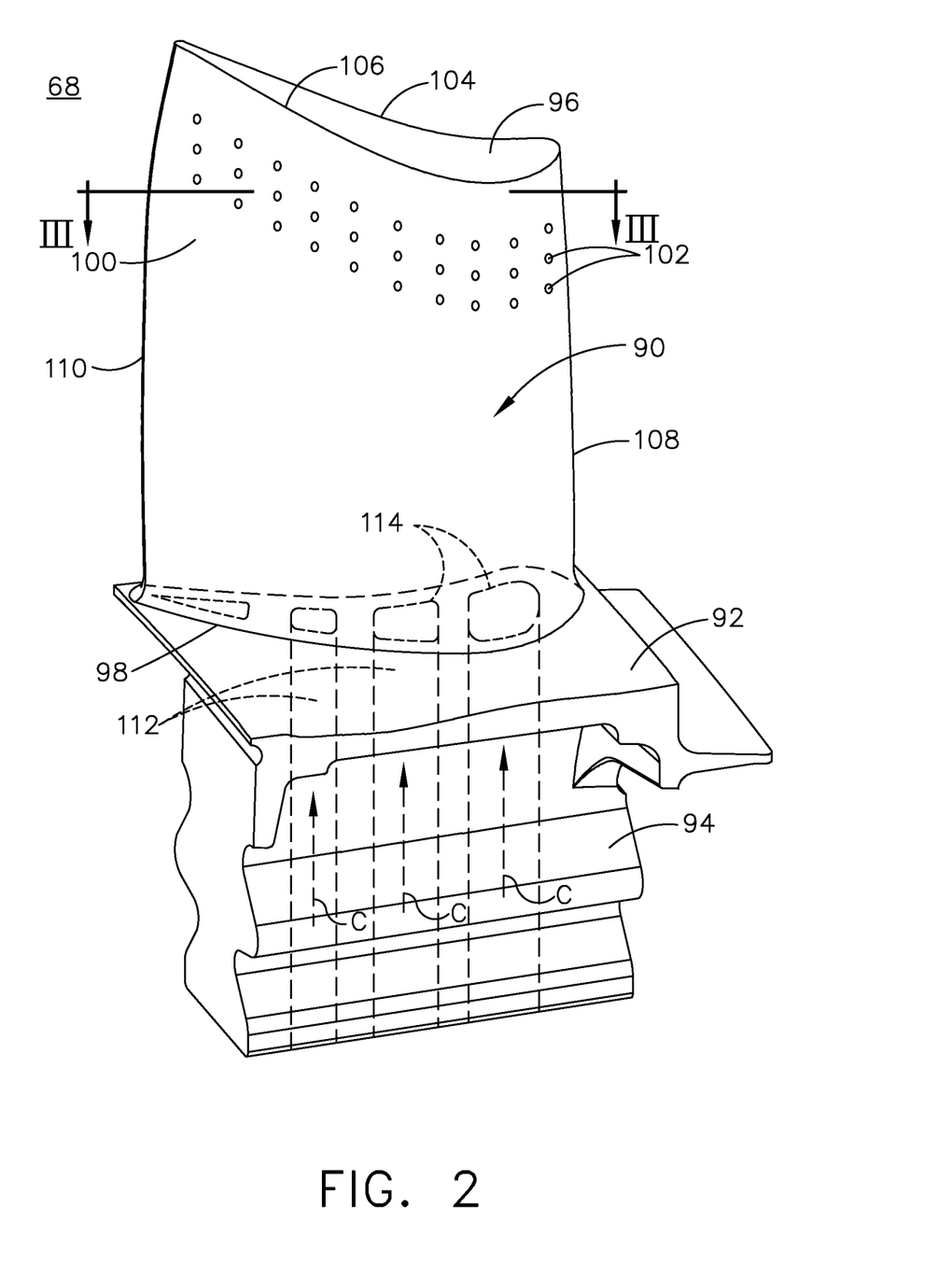
FIG. 2 is an isometric view of an exemplary airfoil for the turbine engine of FIG. 1.

FIG. 2 is a perspective view of an example of an engine component illustrated as an airfoil 90, a platform 92, and a dovetail 94, which can be a rotating blade 68, as shown in FIG. 1. Alternatively, it is contemplated that the airfoil 90 can be a stationary vane, such as the vane 72 of FIG. 1, while any suitable engine component is contemplated. The airfoil 90 includes a tip 96 and a root 98, defining a span-wise direction there between. Additionally, the airfoil 90 includes a wall 100. A pressure side 104 and a suction side 106 are defined by the airfoil shape of the wall 100. At least one cooling hole 102, by way of non-limiting example a film-hole, is formed in the wall 100. The at least one cooling hole 102 can be multiple cooling holes 102 as illustrated, and, by way of non-limiting example, can be located along the suction side 106 of the airfoil 90. The airfoil 90 further includes a leading edge 108 and a trailing edge 110, defining a chord-wise direction.

The airfoil 90 mounts to the platform 92 at the root 98. The platform 92 is shown in section, but can be formed as an annular band for mounting a plurality of airfoils 90. The airfoil 90 can fasten to the platform 92, such as welding or mechanical fastening, or can be integral with the platform 92 in non-limiting examples.

The dovetail 94 couples to the platform 92 opposite of the airfoil 90, and can be configured to mount to the disk 71, or rotor 51 of the engine 10 (FIG. 1), for example. In one alternative example, the platform 92 can be formed as part of the dovetail 94. The dovetail 94 can include one or more inlet passages 112, having an outlet 114 disposed at the root 98. The inlet passages 112 can provide a cooling fluid flow (C) to an interior 116 (FIG. 3) of the airfoil 90 at the outlet 114 for cooling of the airfoil 90 in one non-limiting example.

It should be understood that while the description herein is related to an airfoil, it can have equal applicability in other engine components requiring cooling such as film cooling. One or more of the engine components of the engine 10 includes a film-cooled substrate, or wall, in which a film cooling hole, or hole, of the disclosure further herein may be provided. Some non-limiting examples of the engine component having a wall can include blades, vanes or nozzles, a combustor deflector, combustor liner, or a shroud assembly. Other non-limiting examples where film cooling is used include turbine transition ducts and exhaust nozzles.

During operation, the airfoil 90 rotates in a direction such that the pressure side 104 follows the suction side 106, such that the airfoil 90 would rotate in a direction out of the page, while any rotational direction or orientation is contemplated.

Figure 3:
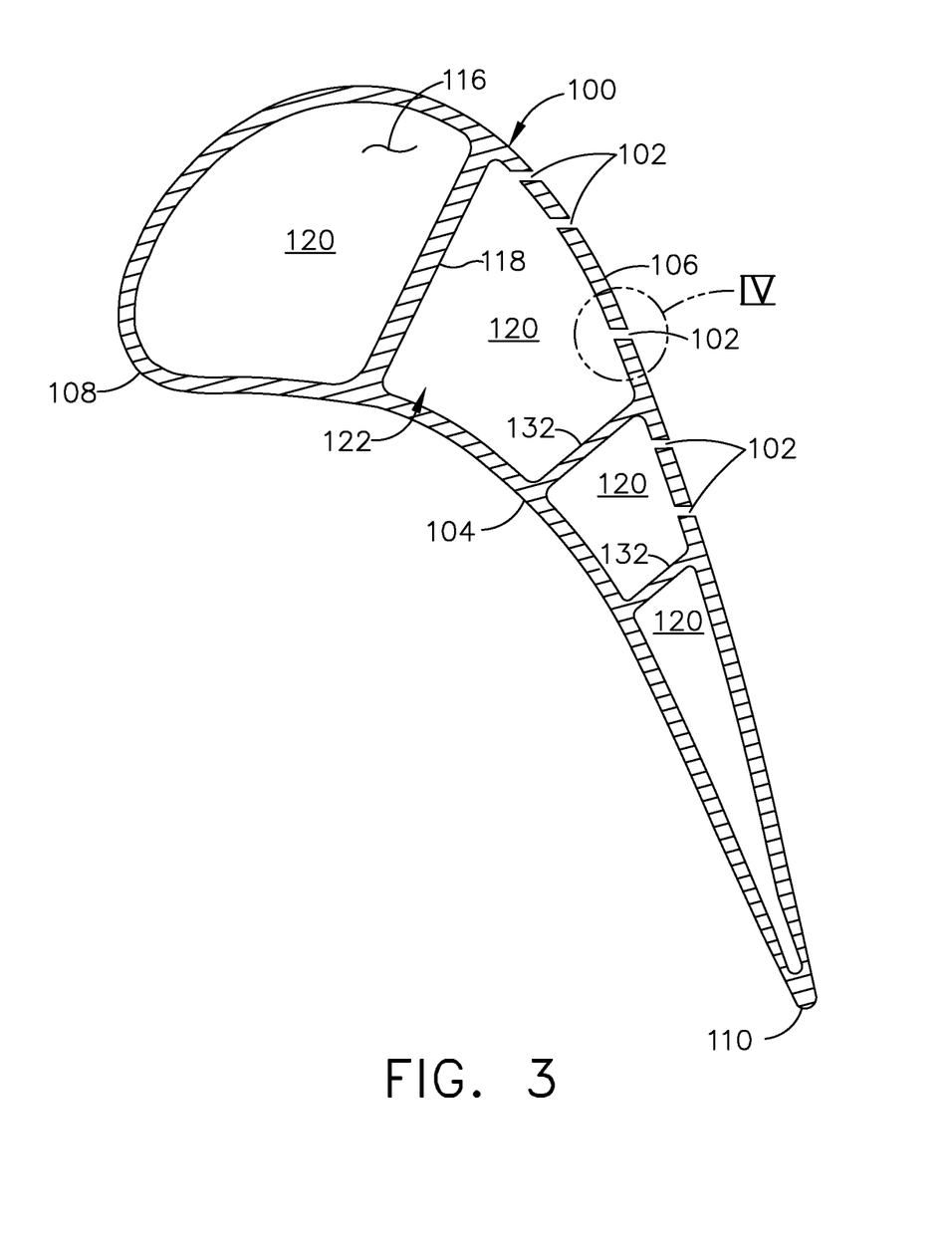
FIG. 3 is a cross-sectional view of the airfoil of FIG. 2 along line III-III.

Referring now to FIG. 3, an interior 116 is defined by the outer wall 100. One or more interior walls shown as ribs 118 can divide the interior 116 into multiple cooling passages 120. Each of the passage outlets 114 of FIG. 2 can be fluidly coupled to one or more internal cooling passages 120. One or more of the internal cooling passages 120 and cooling holes 102 can be fluidly coupled to each other and at least partially form one or more cooling circuits 122 within the airfoil 90, which may or may not include the inlet passages 112 and passage outlets 114 of FIG. 2. At least one of the cooling passages 120 is in fluid communication with the cooling holes 102.

It should be appreciated that the interior structure of the airfoil 90 is exemplary as illustrated. The interior 116 of the airfoil 90 can be organized in a myriad of different ways, and the cooling passages 120 can include single passages extending in the span-wise direction, or can be complex cooling circuits, having multiple features such as passages, channels, inlets, outlets, ribs, pin banks, circuits, sub-circuits, cooling holes, plenums, mesh, turbulators, or otherwise in non-limiting examples.

Figure 4:
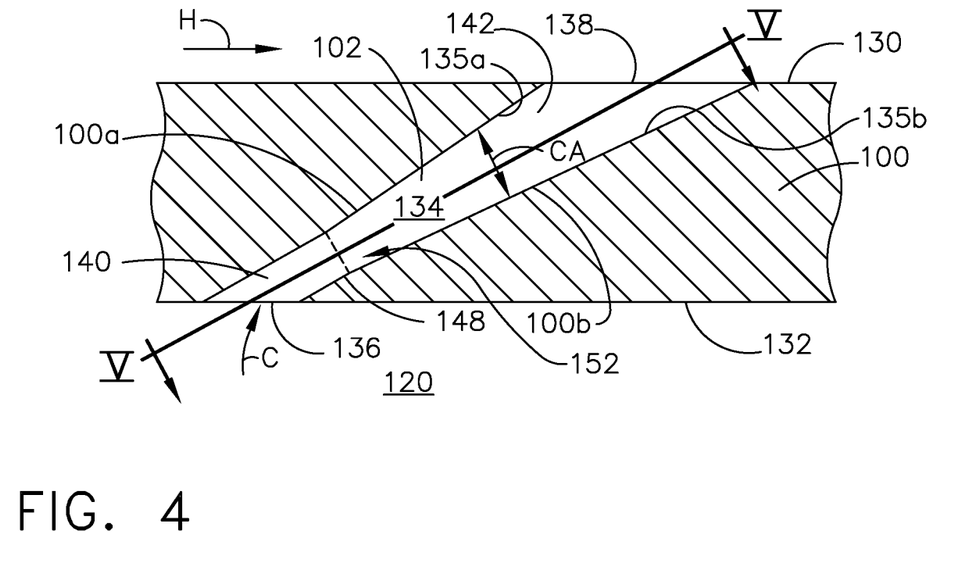
FIG. 4 is an enlarged view of a cooling hole for the airfoil of FIG. 3 according to an aspect of the disclosure herein.

FIG. 4 is a schematic, sectional view of one of the cooling holes 102 extending through the wall 100 of the airfoil 90 to define spaced side walls 100a, 100b. It should be understood that the side walls 100a, 100b can be continuously connected to one another, such as in the case of a rounded cooling hole 102. The wall 100 includes a heated surface 130 facing a hot gas flow (H) and a cooled surface 132 facing a cooling fluid (C). In one non-limiting example, the cooled surface 132 can form a portion the cooling passage 120 and the heated surface 130 can form a portion of the exterior of the wall 100. Suitable materials for the wall 100 include, but are not limited to, steel, refractory metals such as titanium, or superalloys based on nickel, cobalt, or iron, and ceramic matrix composites. The superalloys can include those in equi-axed, directionally solidified, and single crystal structures, for example.

It is noted that although the wall 100 is shown as being generally planar in FIG. 4, it should be understood that the wall 100 can be curved for many engine components. Whether the wall 100 is planar or curved local to the cooling hole 102, the hot and cooled surfaces 130, 132 can be parallel to each other as shown herein, or can lie in non-parallel planes.

The cooling hole 102 provides fluid communication between the interior 116 and exterior of the airfoil 90. During operation, the cooling fluid flow (C) is supplied to the interior 116, such as the cooling passage 120, and exhausts from the cooling hole 102, and can form a thin layer or film of cool air along the heated surface 130. While only one cooling hole 102 is shown in FIG. 3, it is understood that the airfoil 90 can include multiple cooling holes 102, which can be arranged in any desired configuration along the wall 100.

A passage 134 defines the cooling hole 102 and extends from an inlet 136 provided on the cooled surface 132 of the wall 100 to an outlet 138 provided on the heated surface 130. The passage 134 includes an interior surface 135 of the cooling hole 102, which includes the side walls 100a, 100b. A centerline (CL) extends linearly from a center point 146 of the inlet 136 to the outlet 138. For clarity of explanation, the interior surface 135 can define an upper surface 135a upstream of the centerline (CL) with respect to the hot gas flow (H) and a lower surface 135b downstream of the centerline (CL). It should be understood that the upper surface 135a and the lower surface 135b can be a surface of the side walls 100a, 100b in part or define the entire surface of the side walls 100a, 100b. By way of non-limiting example upper surface 135a can define the surface of sidewall 100a.

A diffusing section 142 can be provided at or near the outlet 138 to define a portion of the passage 134. In one exemplary implementation, the diffusing section 142 defines the outlet 138. The diffusing section 142 can have an increasing cross-sectional area (CA) extending toward the outlet 138. In one example, the cross-sectional area (CA) is continuously increasing as illustrated. In one alternative, non-limiting implementation, the increasing cross-sectional area can be discrete.

The passage 134 can include a metering section 140 having a circular cross section, though it could have any cross-sectional shape. The metering section 140 can be provided at or near the inlet 136. The metering section 140 is upstream of the diffusing section 142 with respect to the direction of cooling fluid flow (C) through the passage 134. The metering section 140 can terminate at the diffusing section 142, defining a junction 148.

The passage 134 connects the inlet 136 and the outlet 138 through which the cooling fluid (C) can flow. The metering section meters the mass flow rate of the cooling fluid flow (C). The diffusing section enables an expansion of the cooling fluid (C) to form a wider and slower cooling film on the heated surface 130. The diffusing section 142 can be in serial flow communication with the metering section 140. It is alternatively contemplated that the cooling hole 102 have a minimal or no metering section 140, or that the diffusion section 142 extends along the entirety of the cooling hole 102.

Figure 5:
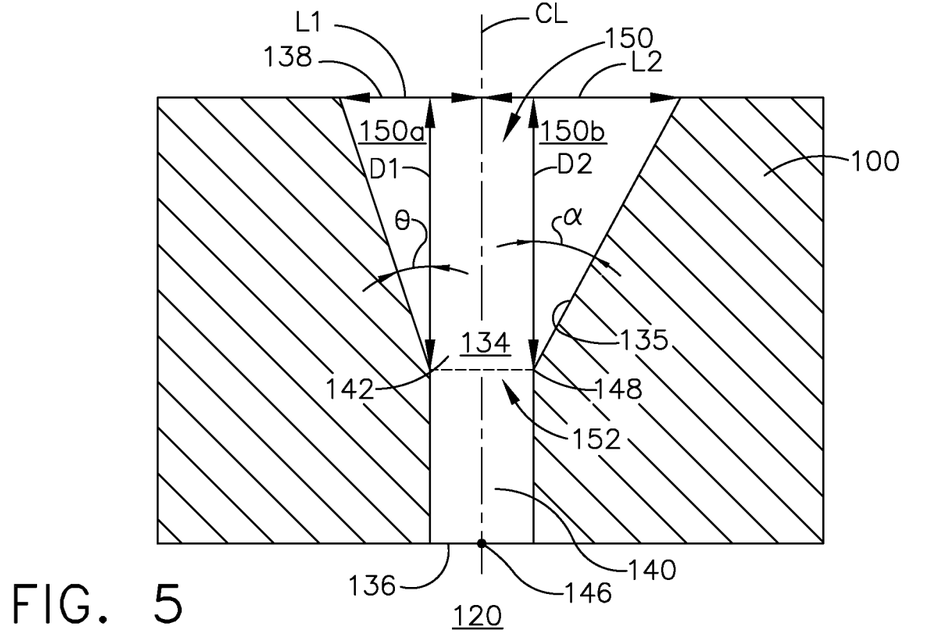
FIG. 5 is a lateral cross-sectional view of the cooling hole from FIG. 4 along line V-V.

Turning to FIG. 5, the cooling hole 102 is illustrated in cross-section along a line V-V from FIG. 4 to define a lateral plane that passes through the centerline (CL). The lateral plane passes through the centerline (CL) such that it extends in and out of the page in FIG. 4. The diffusing section 142 further defines an asymmetrical shape with respect to the centerline (CL). An asymmetrical fan shape 150, having a substantially trapezoidal shape as viewed in the lateral plane, defines the asymmetrical shape for the diffusion section 142, by way of non-limiting example. It should be understood that the trapezoidal shape is a non-limiting example and that any asymmetrical shape of the diffusion section 142 can be contemplated, including but not limited to triangular, conical, cylindrical.

A first and second depth D1, D2 are distances measured from the outlet 138 to the junction 148, by way of non-limiting example the height of the asymmetrical fan shape 150 when viewed in the lateral plane. The depths can be measured along two lines D1, D2, having equal lengths, that are parallel to the centerline (CL). Each line can form a boundary for a first and second fan portion 150a, 150b. The first fan portion 150a extends laterally from the line D1 to the interior surface 135. The angle of the diffusion section 142 in the first fan portion 150a orients the interior surface 135 at a first side angle Θ relative to the line D1. A second fan portion 150b extends laterally from the line D2. Similarly, the angle of the diffusion section 142 in the second fan portion 150b orients interior surface 135 at a second side angle α different than the first side angle Θ. It should be understood that the angles illustrated can be measured from the centerline (CL) where a line tangent to the interior surface 135 would intersect the centerline (CL). By way of non-limiting example, the second side angle α is greater than the first side angle Θ. It should be understood that the first side angle Θ can be greater than the second side angle α.

Lateral lengths L1, L2 are measured from the centerline (CL) to the interior surface 135 of the cooling hole 102 at the outlet 138. Lateral length L1 corresponds to the first fan portion 150a and lateral length L2 corresponds to the second fan portion 150b. In one non-limiting example, the lateral length L1 can be less than lateral length L2, as defined by the differences between the first and second side angles Θ, α.

A transition section 152 is defined as a region between the diffusing section 142 and the metering section 140. In implementations without a metering section 140, the transition section 152 can be the region between the inlet 136 and the diffusing section 142. The transition section 152 is defined as the region where cooling fluid (C) begins to become divergent, or arrives in an increasing flow area. The transition section 252 can be abrupt as illustrated, or encompass an extended portion. The transition section 252 can differ from the diffusing section in that it may include only portions which are diverging and portions that remain linear.

Figure 6:
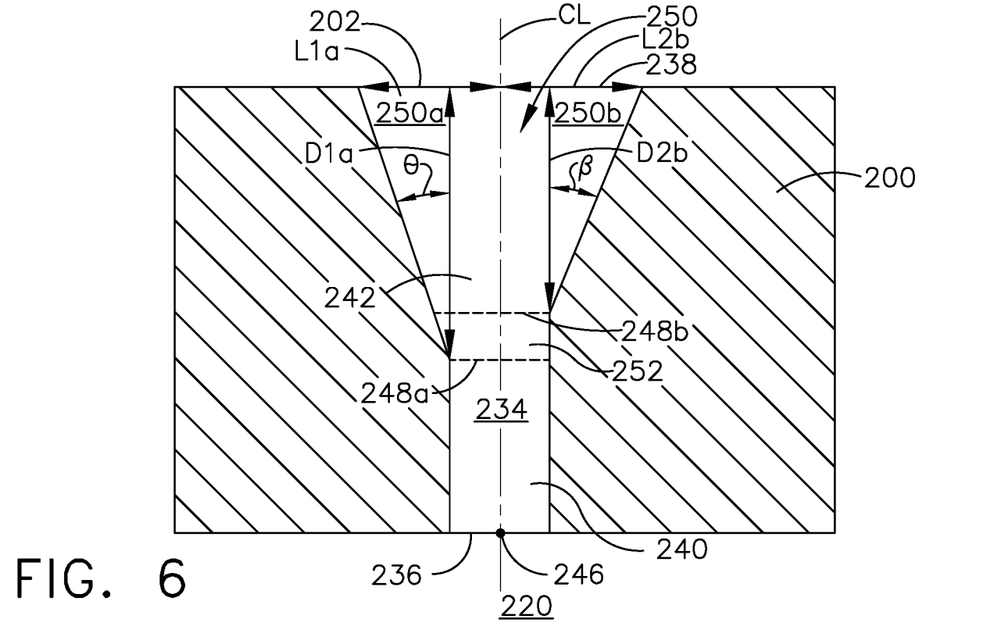
FIG. 6 is a lateral cross-sectional view of the cooling hole from FIG. 4 according to another aspect of the disclosure herein.

FIG. 6 is a lateral cross-section similar to FIG. 5 of an alternative cooling hole 202 according to the disclosure discussed herein. The cooling hole 202 is substantially similar to the cooling hole 102 of FIG. 5. Therefore, like parts will be identified with like numerals increased by 100, with it being understood that the description of the like parts of the cooling hole 102 applies to the cooling hole 202 unless otherwise noted.

A first junction 248a is located at a first depth D1a while the second junction 248b is located at a second depth D2b. A diffusing section 242 further defines an asymmetrical fan shape 250. The asymmetrical fan shape 250 includes a transition section 252 extending along centerline (CL) between the first junction 248a and the second junction 248b. The transition section 252 is defined as a region between the diffusing section 242 and a metering section 240. In implementations without a metering section 240, a transition section 252 can be the region between the inlet 236 and the diffusing section 242. The transition section 252 can be abrupt, or encompass an extended portion as illustrated.

A first fan portion 250a extends laterally from the line D1a at a first side angle Θ with an increasing cross-sectional area (CA) toward the outlet 238. A second fan portion 250b extends laterally from the second depth line D2b at a second side angle Θ toward the outlet 238. It is contemplated that the first side angle Θ can be equal to the second side angle β. In an implementation where the side angles are equal, the depths differences define the asymmetrical shape.

Lateral lengths L1a, L2b are measured from the centerline (CL) to the interior surface 235 of the cooling hole 202 at the outlet 238. Lateral length L1a corresponds to the first fan portion 250a and can be greater than or less than lateral length L2 which corresponds to the second fan portion 250b, depending upon the combination of D1, D2, Θ, and β.

Figure 7:
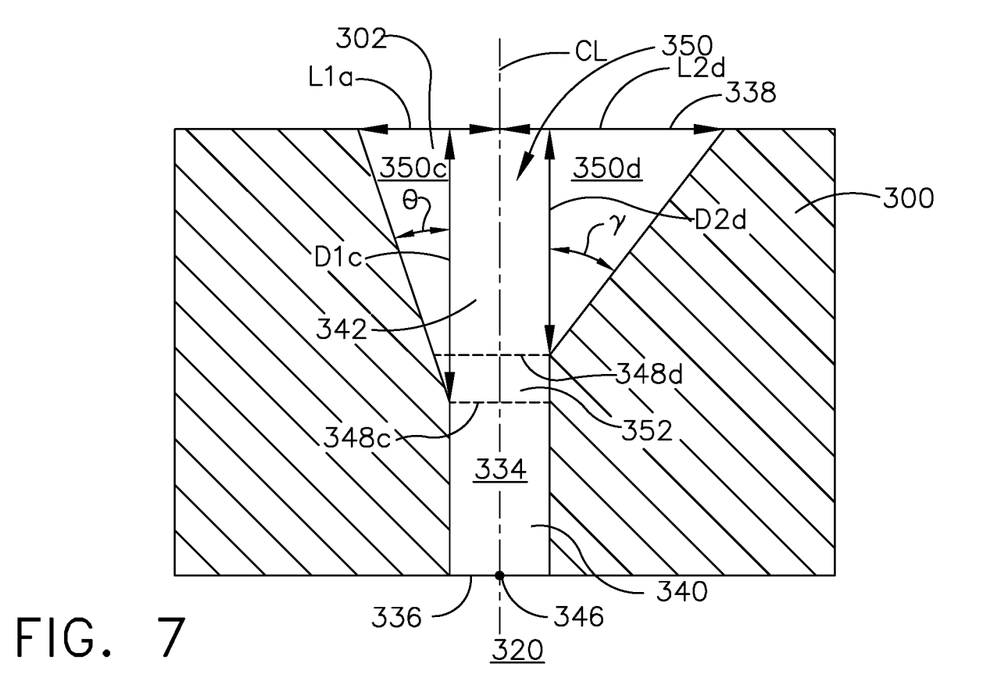
FIG. 7 is a lateral cross-sectional view of the cooling hole from FIG. 4 according to yet another aspect of the disclosure herein.

Turning to FIG. 7 is a lateral cross-section similar to FIG. 6 of a cooling hole 302 according to another aspect of the disclosure discussed herein. The cooling hole 302 is similar to the cooling hole 202 of FIG. 6. Therefore like parts will be identified with like numerals increased by 100, with it being understood that the description of the like parts of the cooling hole 202 applies to the cooling hole 302 unless, otherwise noted.

With respect to the third cooling hole 302 as described herein, much of the same geometry limitations of cooling hole 202 are illustrated in that the third cooling hole 302 includes an asymmetrical fan shape 350 having a first side angle Θ with a different value than the second side angle γ. By way of non-limiting example, the second side angle γ can be greater than the first side angle Θ.

It should be noted that the first depth D1c at which the first side angle Θ begins illustrated as being longer than the second depth D2d at which the second side angle γ begins is for illustrative purposes only, as well as the locations of the corresponding junctions 348c and 348d. Alternatively, it is contemplated that the second depth D2d can be longer than the first depth D2c and the first side angle Θ can be greater than the second side angle γ. Any combination of depths and side angle values is contemplated in the disclosure described herein so long as the side angles have differing values.

A method of forming, by way of non-limiting example, the cooling hole 102 can include forming the diffusing section 142 with an asymmetrical shape, such as the asymmetrical fan shape 150 as described herein. It should be understood that though the numbers for cooling hole 102 are applied here, the method can be used to form cooling holes 202 and 302 respectively. Forming of the cooling hole 102 can be done in any suitable manner including but not limited to casting, additive manufacturing, drilling, or electrical discharge machining with a laser. A two-step drilling process utilizing any of the aforementioned suitable manners can also be utilized where the passage 134 is drilled and then the asymmetrical fan shape 150 is formed. It should be understood that any suitable method for forming the cooling hole 102 is contemplated and that manners discussed herein are for illustrative purposes and not meant to be limiting.

The method can further include forming the metering section 140 upstream of the diffusing section 142 with respect to the cooling fluid flow (C) and fluidly coupling the metering section 140 to the inlet 136.

As described herein, the method further includes forming the first side angle Θ and the second side angle α to define the asymmetrical shape 150 relative to the centerline (CL). More specifically the first side angle Θ is formed with a different angle than the second side angle α. It should be understood that while illustrated as starting at a first or second depth, the angles can simply define the asymmetrical shape 150 and start at the inlet 136 in a case where no metering section 140 is present.

Another method as described herein can further include forming the first side angle Θ with the same value of the second side angle β wherein the first side angle Θ begins at a different first depth D1a, relative to the outlet 238 and parallel to the centerline (CL), than a second depth D2b at which the second side angle β begins.

Another alternative method as described herein can further include forming the first side angle Θ at a different first depth D1c, relative to the outlet and parallel to the centerline, than a second depth D2d at which the second side angle γ begins.

Figure 8:
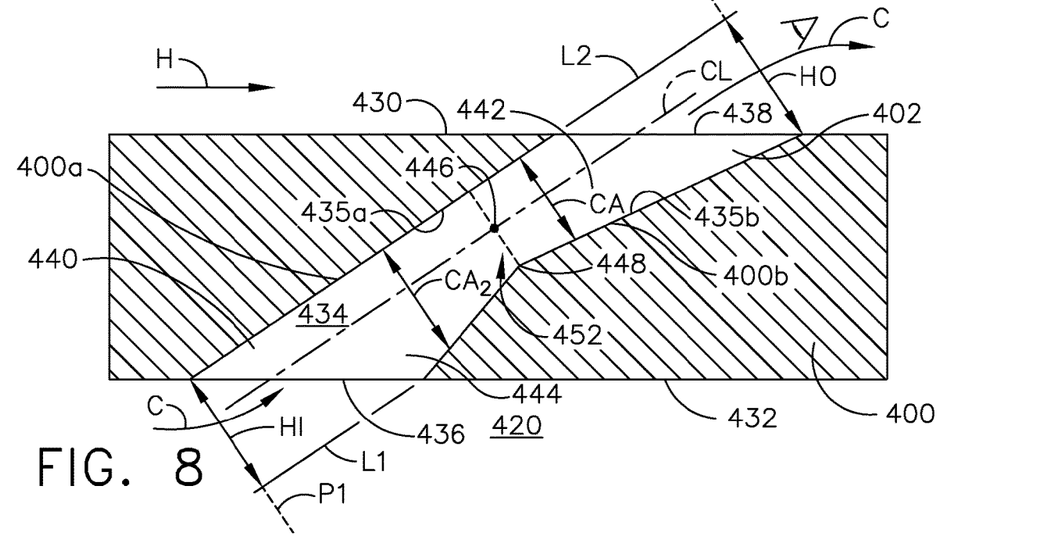
FIG. 8 is an enlarged view of a cooling hole for the airfoil of FIG. 3 according to another aspect of the disclosure herein.

Turning to FIG. 8 a cooling hole 402 extends through a wall 400 of an airfoil, such as the airfoil 90 of FIG. 2. The cooling hole 402 is similar to the cooling hole 102 of FIG. 5. Therefore like parts will be identified with like numerals increased by 300, with it being understood that the description of the like parts of the cooling hole 102 applies to the cooling hole 402 unless otherwise noted.

The wall 400 includes a heated surface 430 facing a hot gas flow (H) and a cooled surface 432 facing a cooling fluid (C). While only one cooling hole 402 is shown in FIG. 8, it is understood that the airfoil 90 can include multiple cooling holes 402, which can be arranged in any desired configuration along the wall 400.

A passage 434 defines the cooling hole 402 and extends from an inlet 436 provided on the cooled surface 432 of the wall 400 to an outlet 438 provided on the heated surface 130. The passage 434 includes an interior surface 435 of the cooling hole 402, which includes side walls 400a, 400b. A centerline (CL) extends linearly from a center point 446 at the junction 448 towards the inlet 436 and the outlet 438. For clarity of explanation, the interior surface 435 can define an upper surface 435a upstream of the centerline (CL) with respect to the hot gas flow (H) and a lower surface 435b downstream of the centerline (CL) with respect to the hot gas flow (H).

A diffusing section 442 can be provided at or near the outlet 438 to define a portion of the passage 434. The diffusing section 442 can have an increasing cross-sectional area (CA) extending toward the outlet 438, where in one implementation the cross-sectional area (CA) is continuously increasing as illustrated. In one alternative, non-limiting implementation, the increasing cross-sectional area can be discrete.

The passage 434 further includes a recessed portion 444. The recessed portion 444 can extend downstream from the inlet 436 with respect to the direction of cooling fluid flow (C). The recessed portion 444 can define a decreasing cross-sectional area (CA2) extending from the inlet towards the diffusing section 442. In one alternative, non-limiting implementation, the recessed portion 444 can terminate at the diffusing section 442, defining a junction 448.

A first plane (P1) can be defined as an area perpendicular to the cooling fluid flow (C) upon entering the cooling hole 402. In some implementations, as illustrated, the first plane (P1) can be perpendicular to the centerline (CL). An inlet dimension, in one non-limiting example an inlet height (HI), can be measured along the plane (P1). The inlet height (HI) can be measured from where the upper surface 435a of the inlet 436 intersects the cooled surface 432 to a first line (L1). The first line (L1) extends beyond the outlet 438 from where the lower surface 435b intersects the cooled surface 432 and is parallel to the centerline (CL). An outlet dimension, in one non-limiting example an outlet height (HO) can be measured along a second plane (P2) parallel to the first plane (P1). The outlet height (HO) can be measured along the second plane (P2) from where the outlet 438 intersects the heated surface 430 to a second line (L2) extending beyond the outlet 438 along the upper surface 435a and parallel to the centerline (CL). The outlet height (HO) is less than the inlet height (HI) defined by the recessed portion 444 at the inlet 436.

The passage 434 can alternatively include a metering section 440 formed by the recessed portion 444 and having a circular cross section, though it could have any cross-sectional shape. The metering section 440 can be provided at or near the inlet 436. The metering section 440 is upstream of the diffusing section 442 with respect to the direction of cooling fluid flow (C) through the passage 434. In one alternative, non-limiting implementation, the metering section 440 can include the recessed portion 444.

The passage 434 is a connecting passage between the inlet 436 and the outlet 438 through which the cooling fluid (C) can flow. The metering section 440 is for metering of the mass flow rate of the cooling fluid flow (C). The recessed portion 444 can change the pressure and flow field in such a manner as to condition the flow passing into the metering section 440. The diffusing section 442 enables an expansion of the cooling fluid (C) to form a wider and slower cooling film on the heated surface 430. The diffusing section 442 can be in serial flow communication with the metering section 440. It is alternatively contemplated that the cooling hole 402 have a minimal or no metering section 440.

It is further contemplated that any of the aforementioned cooling holes 102, 202, 302 with the asymmetrical fan shapes 150, 250, 350 can further include a recessed portion 444 as described above.

Figure 9:
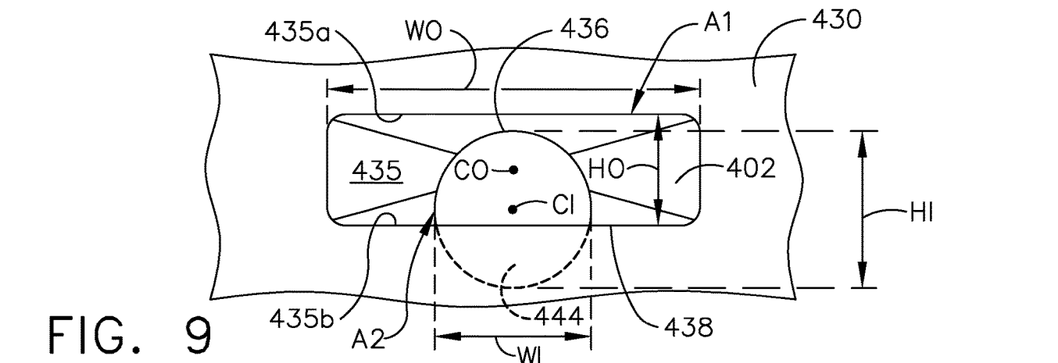
FIG. 9 is a view of the cooling hole from FIG. 8 looking at an outlet towards an inlet.

FIG. 9 illustrates the cooling hole 402 as viewed from the outlet 438 in towards the inlet 436 in FIG. 8. The outlet 438 defines a first bound area (A1). The outlet 438 includes a center point (CO) centrally located with respect to the first bound area (A1). An outlet width (WO) is the dimension of the outlet 438 as measured perpendicularly to the outlet height (HO), in one non-limiting example it is the largest dimension of the first bound area (A1). As illustrated the first bound area (A1) is a rounded rectangular shape, but can also have any suitable shape for diffusion. The outlet height (HO) is less than the inlet height (HI) defined by the recessed portion 444 at the inlet 436. In certain implementations, the inlet height (HI) is less than or equal to 50% of the outlet width (WO).

The inlet defines a second bound area (A2). The recessed portion 444 is formed in the lower surface 435b of the interior 435 of the channel 434 such that a portion of the second bound area (A2) defines the inlet height (HI) and lies outside the first bound area (A1). At least a portion of the second bound area (A2) can be above the first bound area as depicted in FIG. 9. The inlet 436 includes a center point (CI) centrally located with respect to the second bound area (A2). While illustrated as a circular shape the second bound area (A2) can define any shape.

Figure 10:
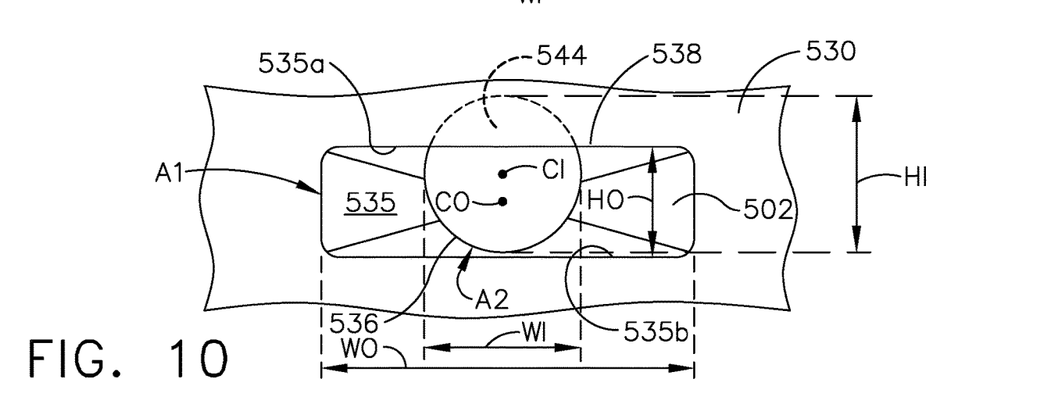
FIG. 10 is an alternative view of a cooling hole looking at an outlet towards an inlet according to another aspect of the disclosure herein.

FIG. 10 illustrates a cooling hole 502 with a recessed portion 544. The recessed portions 544 is similar to the recessed portion 444 therefore like parts will be identified with like numerals increased by 100, with it being understood that the description of the like parts of the recessed portion 444 applies to the other recessed portion 544 unless, otherwise noted. The recessed portion 544 is formed in an upper surface 535a of the interior 535 of the channel 534. The height (HO) of the outlet 538 is smaller than the height (HI) of the inlet 536. As illustrated it is further contemplated that at least a portion of the second bound area (A2) can be below the first bound area as depicted in FIG. 10.

Figure 11:
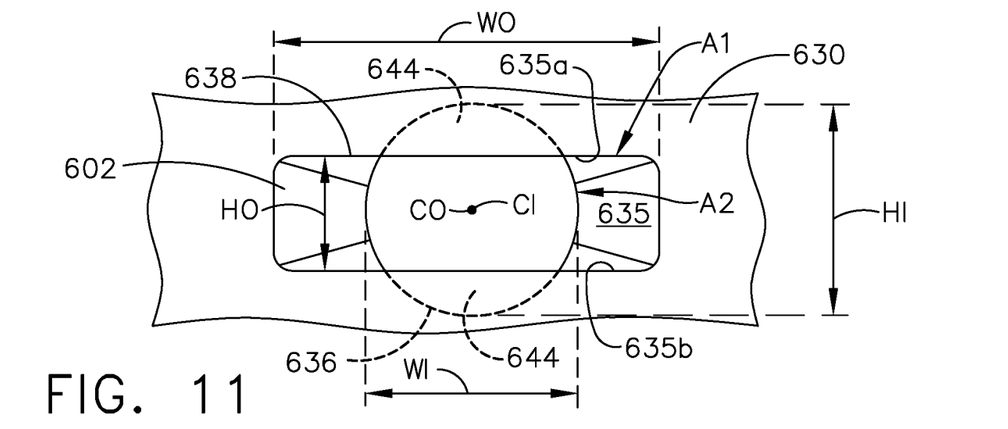
FIG. 11 is another alternative view of a cooling hole looking at an outlet towards an inlet according to another aspect of the disclosure herein.

FIG. 11 illustrates an alternative cooling hole 602 with a recessed portion 644. The recessed portions 644 is similar to the recessed portion 444 therefore like parts will be identified with like numerals increased by 200, with it being understood that the description of the like parts of the recessed portion 444 applies to the other recessed portion 644 unless, otherwise noted. The recessed portion 644 is formed in both the upper surface 635a and the lower surface 635b of the interior surface 635 of the channel 634.

Figure 12:
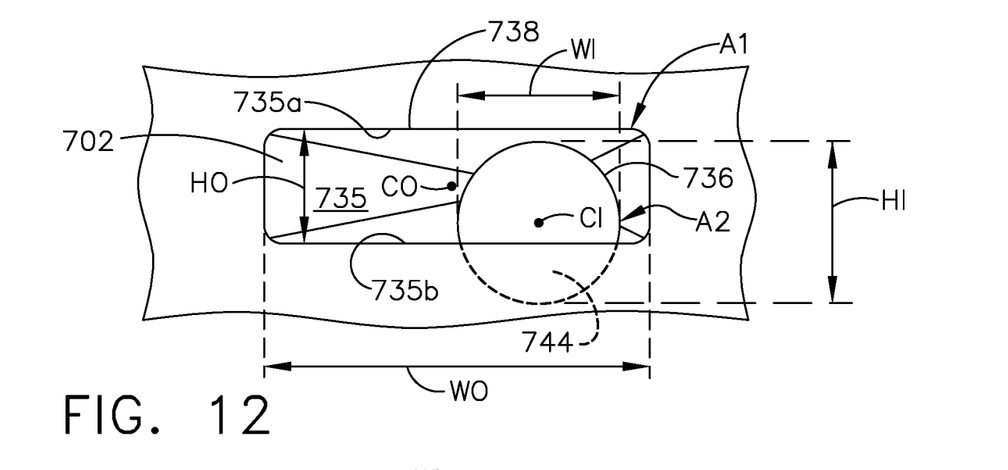
FIG. 12 is another alternative view of a cooling hole looking at an outlet towards an inlet according to another aspect of the disclosure herein.
Figure 13:
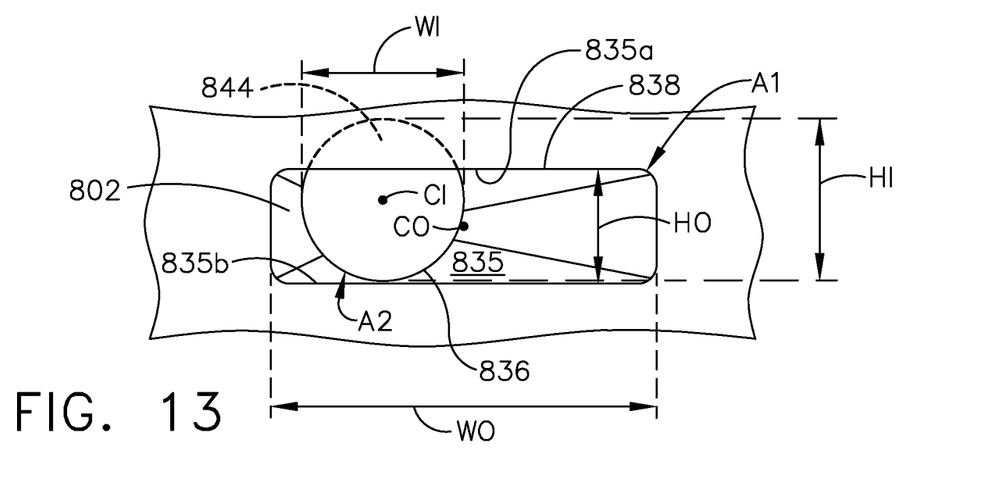
FIG. 13 is another alternative view of a cooling hole looking at an outlet towards an inlet according to another aspect of the disclosure herein.

While illustrated as having an inlet 636 and outlet 638 with center points (CI), (CO) respectively that are both collinear and coplanar, it should be understood that the recessed portion 644 can be formed in both the upper surface 635a and the lower surface 635b of the interior surface 635 of the channel 634 and not be either collinear or coplanar as illustrated in FIGS. 12 and 13. The height (HO) of the outlet 638 is smaller than the height (HI) of the inlet 636. It is further contemplated that the second bond area (A2) can be above and below the first bound area (A1).

FIG. 12 illustrates a cooling hole 702 with a recessed portion 744. The recessed portions 744 is similar to the recessed portion 444 therefore like parts will be identified with like numerals increased by 300, with it being understood that the description of the like parts of the recessed portion 444 applies to the other recessed portion 744 unless, otherwise noted.

The recessed portion 744 is formed in the lower surface 735b of the interior surface 735 of the channel 734 and is asymmetrically oriented such that a center point (CI) of the inlet 736 is neither collinear or coplanar with a center point (CO) of the outlet 738. It should be further understood that the recessed portion 744 can be formed along any part of the lower surface 735b. The height (HO) of the outlet 738 is smaller than the height (HI) of the inlet 736.

FIG. 13 illustrates a cooling hole 802 with a recessed portion 844. The recessed portions 844 is similar to the recessed portion 444 therefore like parts will be identified with like numerals increased by 400, with it being understood that the description of the like parts of the recessed portion 444 applies to the other recessed portion 844 unless, otherwise noted.

The recessed portion 844 is formed in the upper surface 835a of the interior surface 835 of the channel 834 and is asymmetrically oriented such that a center point (CI) of the inlet 836 is neither collinear or coplanar with a center point (CO) of the outlet 838. It should be further understood that the recessed portion 844 can be formed along any part of the upper surface 835a. The height (HO) of the outlet 838 is smaller than the height (HI) of the inlet 836.

Another method of forming the cooling hole as described herein can include forming the diffusing section 442 with the 438 outlet at the heated surface 430 to define the outlet height (HO) and the inlet 436 to define the inlet height (HI). It should be understood that while utilizing numbers associated with cooling hole 402, the method of forming the cooling hole as described herein can be applied to cooling holes 502, 602, 702, and 802. The outlet 438 connects to the inlet 436. The method can include forming the recessed portion 444 along the passage 434 wherein the recessed portion 444 defines at least a portion of the inlet height (HI). The method can further include overlapping the diffusing section 442 with the recessed portion 444 such that the recessed portion 444 defines at least a part of the transition portion 452 as described herein. The method can also include forming the metering section 440 to include the recessed portion 444. By way of non-limiting example, the recessed portion 444 can extend from the diffusing section 442 through the transition portion 452 and along a surface within the metering section 440.

The method as described herein can further include forming the recessed portion 444 on one of the upper surface 435a or the lower surface 435b of the interior surface 435 defining the passage 434. By way of non-limiting example, the recessed portion 444 can be formed in the lower surface 435b as illustrated in FIG. 9. The method as described herein can further include by way of non-limiting example, forming the recessed portion 544 in the upper surface 535a as illustrated in FIG. 10. As illustrated in FIG. 11, the method as described herein can include forming the recessed portion 644 on both the upper surface 635a and the lower surface 635b of the interior surface 635.

As illustrated in FIGS. 12 and 13, the method as described herein can include connecting the outlet 738, 838 to the inlet 736, 836 with an asymmetrical alignment relative to the first plane P1 or the second plane P2 as described herein such that the inlet center point (CI) and the outlet center point (CO) are not aligned. As is illustrated the recessed portion 744, 844 can be located in the lower surface 735b or the upper surface 835a.

Film cooling for engine components as described herein can provide for maximizing coverage and minimizing jet penetration into the hot gas flow. Biasing of the cooling hole shape including varying depths depending on side angle can contribute to fulfilling the objectives for film cooling. Intentional trenching to increase inlet height with respect to the outlet height of the cooling hole can also contribute to fulfilling the objectives. Concentrating on the sides and surfaces within the cooling hole as separate components allows for precise optimization of the fluid dynamics, and protects for variation from design intent in the field on as manufactured parts.

Technical benefits associated with the disclosure as described herein include increasing a cooling effectiveness to help hot gas path components meet durability. Benefits associated with focusing on the geometry within the cooling hole at specific locations increases film effectiveness, increases hot gas path durability, reduces services costs, reduces manufacturing & inspection costs, and enhances specific fuel consumption. Hot gas path durability, for example, can mean longer life for components exposed to hot gas.

It should be appreciated that application of the disclosed design is not limited to turbine engines with fan and booster sections, but is applicable to turbojets and turbo engines as well.

This written description uses examples to illustrate the disclosure as discussed herein, including the best mode, and also to enable any person skilled in the art to practice the disclosure as discussed herein, including making and using any devices or systems and performing any incorporated methods. The patentable scope of the disclosure as discussed herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A component for a turbine engine, which generates a hot gas flow, and provides a cooling fluid flow, comprising:
    a wall separating the hot gas flow from the cooling fluid flow and having a heated surface along which the hot gas flows and a cooled surface facing the cooling fluid flow; and
    at least one cooling hole comprising a connecting passage extending between an inlet at the cooled surface and an outlet located at the heated surface defining a centerline extending linearly from a center point of the inlet to the outlet, having an upper surface located on an upstream side of the connecting passage with respect to the hot gas flow and a lower surface on a downstream side of the connecting passage with respect to the hot gas flow, and the outlet defining a diffusing section having an increasing cross-sectional area in a direction toward the heated surface and defining spaced apart first and second side walls forming an asymmetrical shape relative to the centerline when viewed from a direction perpendicular to a lateral plane parallel to one of the upper or lower surface and extending through the centerline, and passing through the first and second side walls;
    wherein a first side angle of the first side wall begins at a first depth relative to the outlet as measured along the centerline, and a second side angle of the second side wall begins at a second depth, different than the first depth relative to the outlet and measured along the centerline; and
    wherein the first and second side walls are each flat surfaces, and are each directly connected to an edge of the connecting passage, the edge lying substantially within a plane perpendicular to the centerline.

2. The component of claim 1 wherein the diffusing section defines the first side angle as between the first side wall and the centerline and the second side angle as between the second side wall and the centerline, and the first side angle is different than the second side angle.

3. The component of claim 1 wherein the cooling hole further comprises a recessed portion.

4. The component of claim 1 wherein the first side angle is equal to the second side angle.

5. The component of claim 1 wherein the at least one cooling hole comprises a metering section located upstream of the diffusing section.

6. The component of claim 5 wherein the metering section is located in at least one of the passage or the inlet.

7. The component of claim 6 wherein the metering section further comprises a recessed portion.

8. The component of claim 1 wherein the cross-sectional area is continuously increasing.

9. An airfoil for a turbine engine, which generates a hot gas flow, and provides a cooling fluid flow, comprising:
    a wall separating the hot gas flow from the cooling fluid flow and having a heated surface along which the hot gas flows and a cooled surface facing the cooling fluid flow; and
    at least one cooling hole comprising a connecting passage extending between an inlet at the cooled surface and an outlet located at the heated surface defining a centerline extending linearly from a center point of the inlet to the outlet, having an upper surface located on an upstream side of the connecting passage with respect to the hot gas flow and a lower surface on a downstream side of the connecting passage with respect to the hot gas flow, and the outlet defining a diffusing section having an increasing cross-sectional area in a direction toward the heated surface and defining spaced apart first and second side walls forming an asymmetrical shape relative to the centerline when viewed from a direction perpendicular to a lateral plane parallel to one of the upper or lower surface and extending through the centerline, and passing through the first and second side walls;
    wherein a first side angle of the first side wall begins at a first depth relative to the outlet as measured along the centerline, and a second side angle of the second side wall begins at a second depth, different than the first depth relative to the outlet and measured along the centerline; and
    wherein the first and second side walls are each flat surfaces, and are each directly connected to an edge of the connecting passage, the edge lying substantially within a plane perpendicular to the centerline.

10. The airfoil of claim 9 wherein the diffusing section defines the first side angle as between the first side wall and the centerline and the second side angle as between the second side wall and the centerline, and the first side angle is different than the second side angle.

11. The airfoil of claim 9 wherein the cooling hole further comprises a recessed portion.

12. The airfoil of claim 9 wherein the first side angle is equal to the second side angle.

13. The airfoil of claim 9 wherein the at least one cooling hole comprises a metering section located upstream of the diffusing section.

14. The airfoil of claim 13 wherein the metering section is located in at least one of the passage or the inlet.

15. The airfoil of claim 14 wherein the metering section further comprises a recessed portion.

16. The airfoil of claim 9 wherein the cross-sectional area is continuously increasing.

17. A method of forming a cooling hole for an engine component having a wall separating a hot gas flow from a cooling fluid flow and having a heated surface along which the hot gas flows and a cooled surface facing the cooling fluid flow, the method comprising:
    forming a connecting passage extending from an inlet to an outlet to define a centerline extending linearly from a center point of the inlet toward the outlet with an upper surface located on an upstream side of the cooling hole with respect to the hot gas flow and a lower surface on a downstream side of the cooling hole with respect to the hot gas flow;

forming a diffusing section with an asymmetrical cross-sectional shape relative to the centerline when viewed from a direction perpendicular to a lateral plane parallel to one of the upper or lower surfaces and extending through the centerline; and forming a first sidewall defining a first angle and a second sidewall defining a second angle such that the side walls together define the asymmetrical shape relative to the centerline;

wherein the first side angle begins at a different depth, relative to the outlet and parallel to the centerline, than the second side angle; and wherein the first and second side walls are each flat surfaces, and are each directly connected to an edge of the connecting passage, the edge lying substantially within a plane perpendicular to the centerline.

18. The method of claim 17 further comprising forming a metering section located upstream of the diffusing section and fluidly coupled to the inlet.

19. The method of claim 17 further comprising forming the first side angle with the same value of the second side angle.

20. The method of claim 17 further comprising forming the first side angle with a different value than the second side angle.

* * * * *